United States Patent
Hirose

(10) Patent No.: US 9,357,121 B2
(45) Date of Patent: May 31, 2016

(54) IMAGE CAPTURING APPARATUS AND CONTROL METHOD THEREOF

(75) Inventor: Minoru Hirose, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 100 days.

(21) Appl. No.: 14/239,644

(22) PCT Filed: Sep. 6, 2012

(86) PCT No.: PCT/JP2012/073383
§ 371 (c)(1),
(2), (4) Date: Feb. 19, 2014

(87) PCT Pub. No.: WO2013/047212
PCT Pub. Date: Apr. 4, 2013

(65) Prior Publication Data
US 2014/0218594 A1    Aug. 7, 2014

(30) Foreign Application Priority Data

Sep. 30, 2011    (JP) .................................. 2011-218321

(51) Int. Cl.
| | |
|---|---|
| *H04N 5/232* | (2006.01) |
| *H04N 3/14* | (2006.01) |
| *G02B 7/34* | (2006.01) |
| *H04N 5/357* | (2011.01) |
| *H04N 5/345* | (2011.01) |

(Continued)

(52) U.S. Cl.
CPC .............. *H04N 5/23212* (2013.01); *G02B 7/34* (2013.01); *H04N 5/3456* (2013.01); *H04N 5/3458* (2013.01); *H04N 5/357* (2013.01); *H04N 5/3696* (2013.01); *G03B 13/36* (2013.01)

(58) Field of Classification Search
CPC ............ H04N 5/23212; H04N 5/2254; H04N 5/2253; H04N 5/335; G03B 13/36
USPC .......................... 348/345, 349, 352, 340, 311
See application file for complete search history.

(56) References Cited

U.S. PATENT DOCUMENTS

| | | | |
|---|---|---|---|
| 6,829,008 | B1 | 12/2004 | Kondo et al. |
| 7,783,185 | B2 | 8/2010 | Kusaka |
| 7,920,781 | B2 | 4/2011 | Onuki |

(Continued)

FOREIGN PATENT DOCUMENTS

| | | | |
|---|---|---|---|
| JP | 2000-156823 A | 6/2000 | |
| JP | 2002-027323 A | 1/2002 | |

(Continued)

OTHER PUBLICATIONS

Office Action dated Sep. 24, 2015, in Japanese Patent Application No. 2011-218321.

*Primary Examiner* — Sinh Tran
*Assistant Examiner* — Xi Wang
(74) *Attorney, Agent, or Firm* — Fitzpatrick, Cella, Harper & Scinto

(57) ABSTRACT

An image capturing apparatus includes an image sensor having first pixels used except for generating image signals and second pixels used for generating the image signals, the first pixels included in a first area, and a signal processing unit configured to perform interpolation processing on signals output from the first pixels in the first area. The signal processing unit performs the interpolation processing on the image signals output from the second pixels in an area other than the first area using a pattern based on an arrangement of the first pixels in the first area.

21 Claims, 12 Drawing Sheets

(51) Int. Cl.
  *H04N 5/369*  (2011.01)
  *G03B 13/36*  (2006.01)

(56) References Cited

U.S. PATENT DOCUMENTS

| | | | |
|---|---|---|---|
| 7,989,745 B2 * | 8/2011 | Suzuki | H04N 5/3696 |
| | | | 250/201.2 |
| 8,466,992 B2 | 6/2013 | Ishii | |
| 8,520,132 B2 | 8/2013 | Amano | |
| 8,964,061 B2 | 2/2015 | Hirose | |
| 2007/0140679 A1 * | 6/2007 | Yumiki | G03B 5/00 |
| | | | 396/180 |
| 2008/0317454 A1 | 12/2008 | Onuki | |
| 2009/0122171 A1 * | 5/2009 | Suzuki | 348/294 |
| 2009/0213255 A1 * | 8/2009 | Suzuki | 348/302 |
| 2011/0096189 A1 | 4/2011 | Taniguchi | |
| 2011/0109775 A1 | 5/2011 | Amano | |
| 2011/0109776 A1 * | 5/2011 | Kawai | H01L 27/14625 |
| | | | 348/273 |
| 2011/0267511 A1 * | 11/2011 | Imafuji | 348/294 |
| 2011/0267533 A1 | 11/2011 | Hirose | |
| 2011/0285899 A1 | 11/2011 | Hirose | |
| 2012/0236185 A1 | 9/2012 | Ishii | |
| 2013/0250154 A1 | 9/2013 | Hirose et al. | |

FOREIGN PATENT DOCUMENTS

| | | |
|---|---|---|
| JP | 2007-279312 A | 10/2007 |
| JP | 2009-003122 A | 1/2009 |
| JP | 2010-020055 A | 1/2010 |
| JP | 2010-028397 A | 2/2010 |
| JP | 2010-062640 A | 3/2010 |
| JP | 2010-181751 A | 8/2010 |
| JP | 2011-101325 A | 5/2011 |
| JP | 2011-124704 A | 6/2011 |

* cited by examiner

FIG. 3A

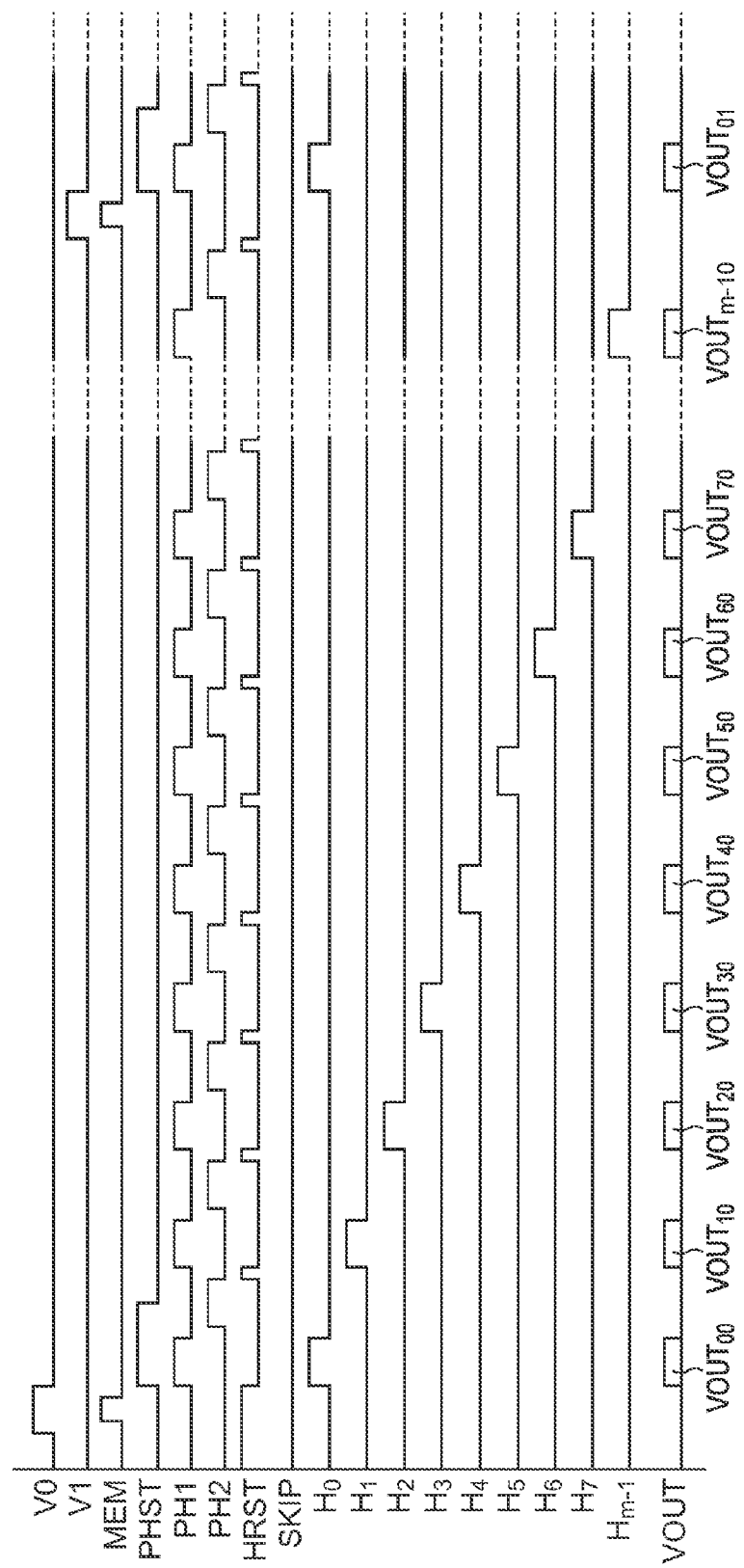

F I G. 4A

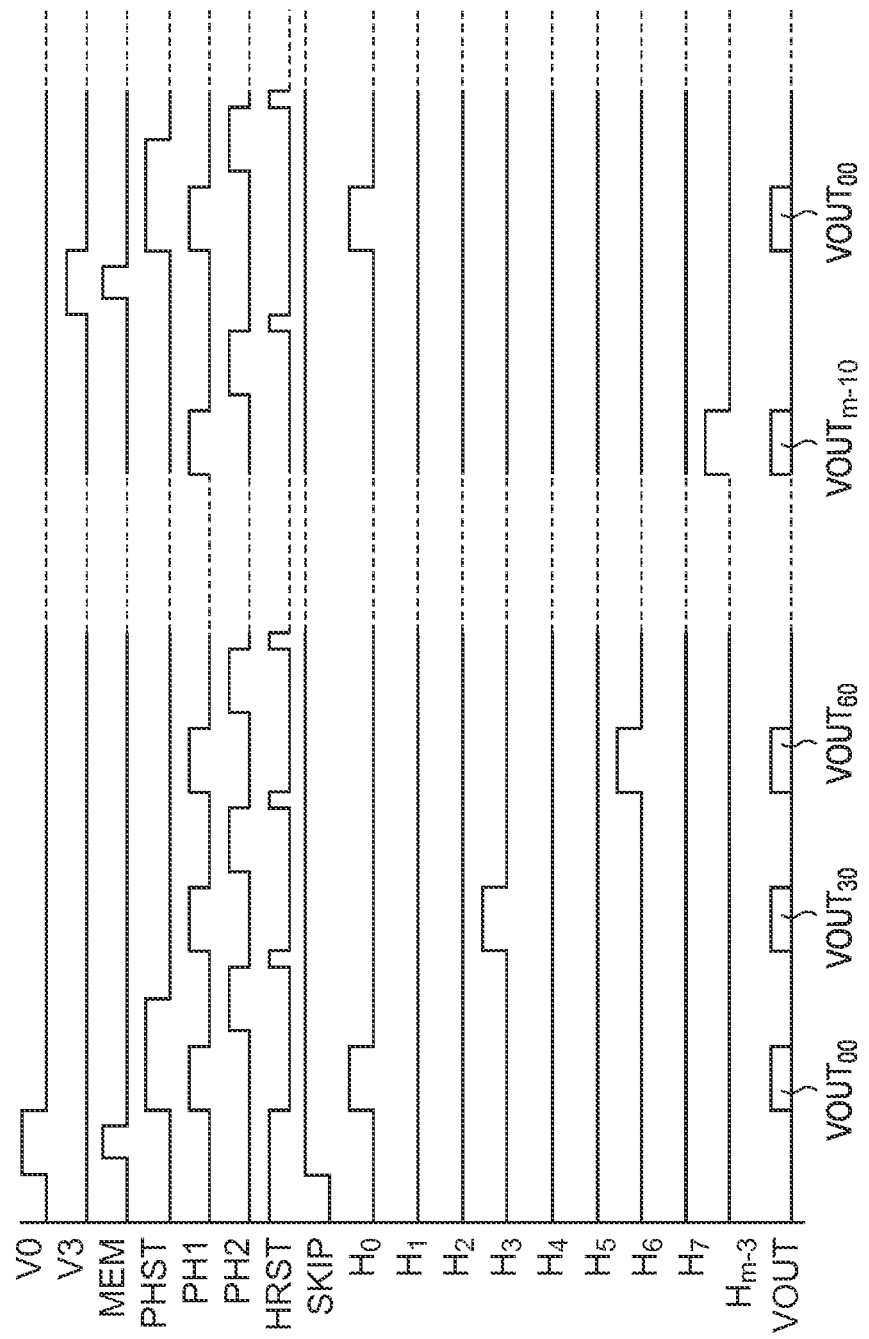

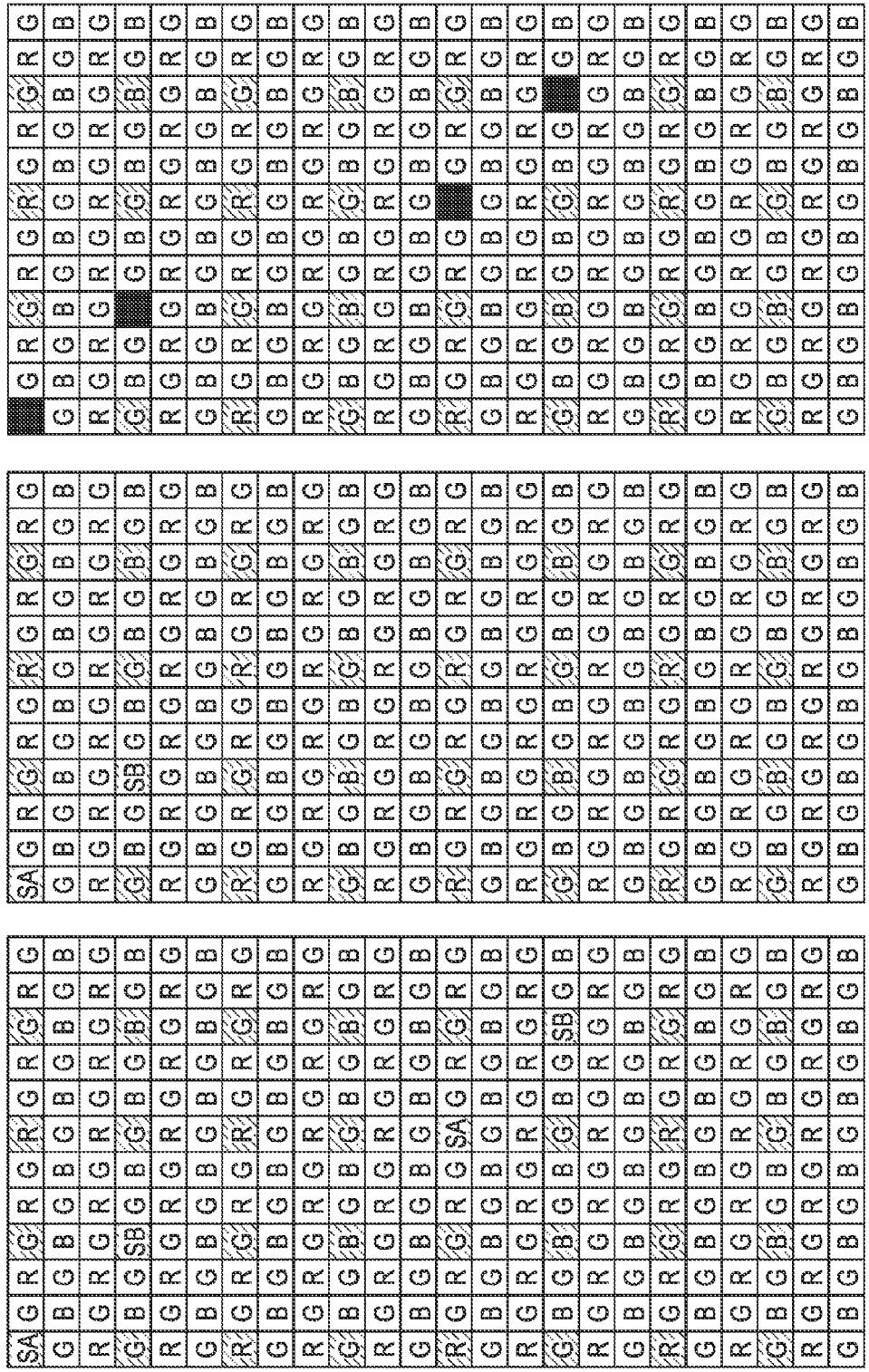

IMAGE CAPTURING APPARATUS AND CONTROL METHOD THEREOF

TECHNICAL FIELD

The present invention relates to an image capturing apparatus having an image sensor including focus detection pixels in part and a control method thereof.

BACKGROUND ART

Among image capturing apparatuses having solid-state image sensor, such as CCD or CMOS sensor, some of these image capturing apparatuses have so-called moving image recording function capable of sequentially recording image signals consecutively read from the image sensors.

Further, as a general method of auto focus detection and adjustment in image capturing apparatuses using a light beam that passes through a photographing lens, a contrast detection method and a phase difference detection method are known.

The contrast detection method is a method which is often adopted to a video movie device for capturing a moving image and an electronic still camera, and an image sensor for capturing an image is also used as a sensor for focus detection. In the contrast detection method, output signals from an image sensor, especially information on a high frequency component (contrast information) is given attention, and the evaluation value of the high frequency component is maximized to attain an in-focus position of the image pickup lens. However, in the contrast detection method, the evaluation value is obtained by slightly moving the image pickup lens so as to maximize the high-frequency components, it is not suitable for high-speed focus control operation.

The phase difference detection method, on the other hand, is often used in single lens reflex cameras, and is the technique that has contributed most to the practical use of autofocus (AF) single lens reflex cameras. According to the phase difference detection method, a light beam that has passed through the exit pupil of the photographing lens is divided into two, and the two divided light beams are respectively received by a pair of focus detection sensors. The amount of defocus for the photographing lens in the focusing direction is directly determined by detecting the difference between the output signals according to the amount of light received, or in other words, an amount of relative positional shift in the direction in which the light beam is divided. Accordingly, once a charge accumulation operation is executed by the focus detection sensors, the amount of defocus and the direction of defocus can be obtained, making it possible to perform a high-speed focus adjustment operation. However, in order to divide light beam that has passed through the exit pupil of the photographing lens into two and obtain signals corresponding to each of two light beams, it is common to provide a light splitting mechanism, such as a quick return mirror and a half mirror, in the image sensing optical path, and provide a focus detection optical system and an AF sensor in the downstream of the light path splitting device. Accordingly, there are disadvantages in the phase difference detection method such that the apparatus becomes large and expensive. In addition, the phase difference detection method cannot be used when displaying a live view image, since a quick return mirror is withdrawn from the light path.

In order to overcome the above disadvantages, a technique has also been disclosed in, for example, Japanese Patent Laid-Open No. 2000-156823, wherein a pupil division mechanism is provided to some of the light-receiving elements (pixels) of an image sensor by offsetting the sensitivity region of the light-receiving portion with respect to the optical axis of the on-chip microlens. These pixels are used as focus detection pixels, and arranged with a prescribed spacing between image pickup pixel groups to perform phase difference focus detection, thereby realizing a high-speed AF using a phase difference method even during using an electronic view finder (EVF) as well as during capturing a moving image.

Further, the following method is disclosed in order to prevent degradation of an image due to moiré and so on when using an EVF and when capturing a moving image. Namely, in an added reading mode for reading pixel signals from an image sensor while adding them, if there are focus detection pixel signals, the reading of pixels signals is performed so that the pixel signals of image pickup pixels and pixel signals of focus detection pixels do not mix (e.g., Japanese Patent Laid-Open No. 2010-20055).

However, in the Japanese Patent Laid-Open Nos. 2000-156823 and 2010-20055, the portions where the focus detection pixels are arranged correspond to portions where image pickup pixels do not exist, so image information is generated through interpolation using information from the peripheral image pickup pixels. Accordingly, when a ratio of the number of the focus detection pixels to the number of the image pickup pixels is sufficiently small, degradation of an image is small, but degradation of an image increases as a ratio of the number of the focus detection pixels to the number of the image pickup pixels increases.

In the meantime, in a case where an EVF mode or a moving image capture mode is set, it is known to read pixel signals from part of the pixels of the image sensor to achieve high speed reading of an image. However, an increase in a ratio of the number of the read focus detection pixels to the number of the read image pickup pixels when reading part of the pixels in comparison to when reading all of the pixels can greatly affect the image quality.

Further, in a case where an area where focus detection pixels are arranged is limited to the central part and its vicinity of the image pickup area where the optical condition is good and relatively high focus detection precision can be achieved and a uniform color plane object is sensed, the following problem is posed. Namely, degradation of an image is tend to be conspicuous at a boundary between an area where focus detection pixels are arranged and an area where no focus detection pixel is arranged due to an correction error using the image pickup pixels arranged around the focus detection pixels.

SUMMARY OF INVENTION

The present invention has been made in consideration of the above situation, and is to make degradation of image quality due to interpolation correction of focus detection pixels less conspicuous at a boundary between an area where focus detection pixels are arranged and an area where no focus detection pixel is arranged in a case where an area where focus detection pixels are arranged is limited to part of the image pickup area.

According to the present invention, provided an image capturing apparatus comprising: an image sensor having first pixels used except for generating image signals and second pixels used for generating the image signals, the first pixels included in a first area; and a signal processing unit configured to perform interpolation processing on signals output from the first pixels in the first area, wherein the signal processing unit performs the interpolation processing on the image signals output from the second pixels in an area other than the first area using a pattern based on an arrangement of the first pixels in the first area.

Further, according to the present invention, provided a control method of an image capturing apparatus which includes an image sensor having first pixels used except for generating image signals and second pixels used for generating the image signals, the first pixels included in a first area, the method comprising: a signal processing step of performing interpolation processing on signals output from the first pixels in the first area, wherein, in the signal processing step, the interpolation processing is performed on the image signals output from the second pixels in an area other than the first area using a pattern based on an arrangement of the first pixels in the first area.

Further, features of the present invention will become apparent from the following description of exemplary embodiments with reference to the attached drawings.

BRIEF DESCRIPTION OF DRAWINGS

The accompanying drawings, which are incorporated in and constitute a part of the specification, illustrate embodiments of the invention, and together with the description, serve to explain the principles of the invention.

FIGS. 3A and 3B are diagrams for explaining full-pixel readout according to the embodiment of the present invention;

FIGS. 4A and 4B are diagrams for explaining thinning readout according to the embodiment of the present invention;

FIGS. 10A to 10C are diagrams showing pixel arrangements of a plurality of focus detection pixels and interpolation patterns according to a modification of the present invention.

DESCRIPTION OF EMBODIMENTS

Exemplary embodiments of the present invention will be described in detail in accordance with the accompanying drawings.

Figure 1:
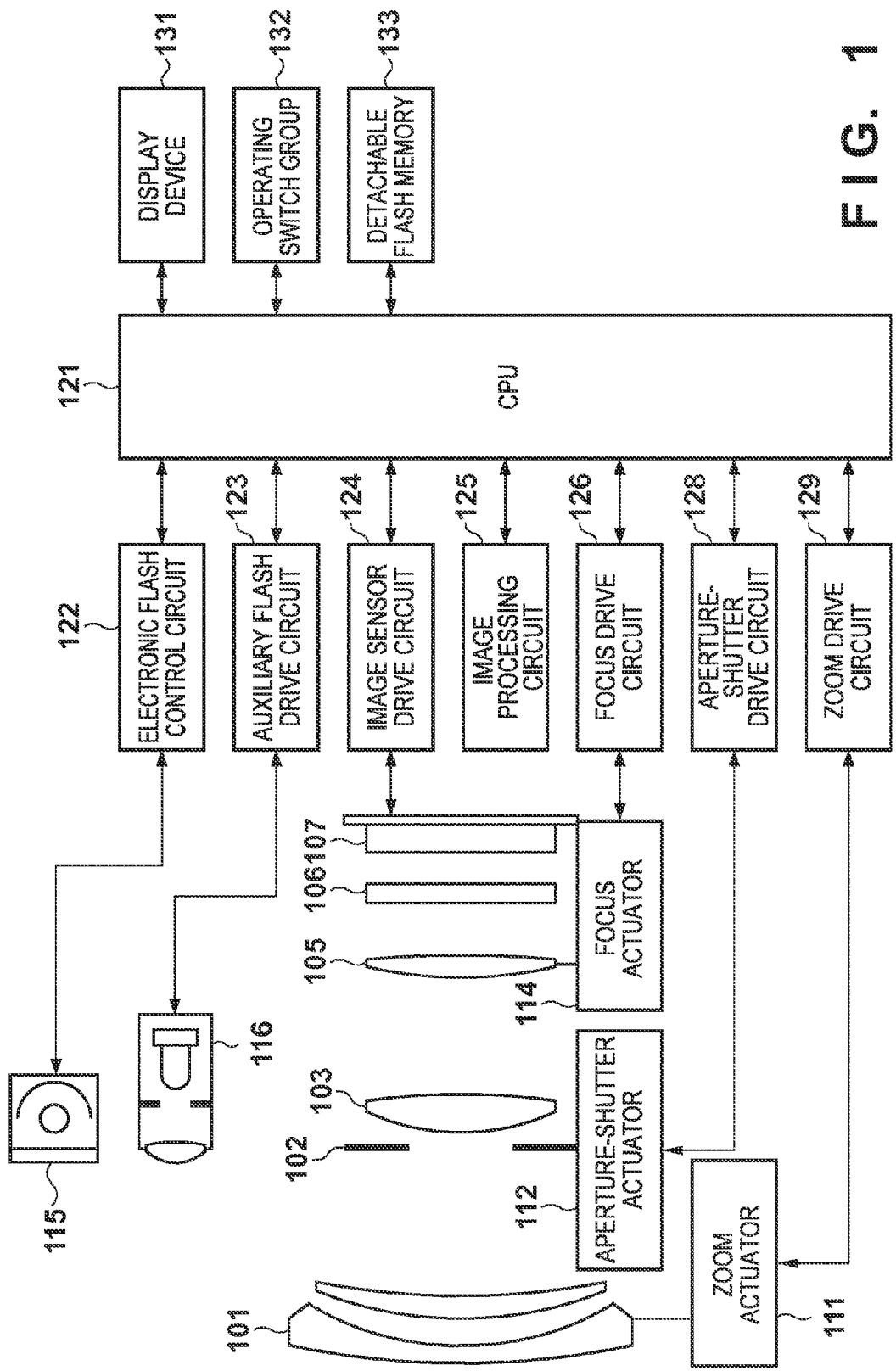
FIG. 1 is a block diagram illustrating a brief configuration of an image capturing apparatus according to an embodiment of the present invention.

FIG. 1 is a configurational diagram of an image capturing apparatus according to an embodiment of the present invention, showing an electronic camera in which a camera body including an image sensor and a photographing optical system are integrated into a single unit. In FIG. 1, a first lens group 101 is disposed on the front end of a photographing optical system (focusing optical system), and supported so as to be movable forward and backward along an optical axis. An aperture-shutter 102 adjusts the diameter of its opening, thereby adjusting the amount of light during photography and also has a function to adjust the exposure time during still image photography. The aperture-shutter 102 and a second lens group 103 move together forward and backward along the optical axis, and, in conjunction with the movement forward and backward of the first lens group 101, provide a magnification change effect (a zoom function).

A third lens group 105 carries out focus adjustment by moving forward and backward along the optical axis. An low-pass optical filter 106 is an optical element for the purpose of reducing false color and moiré of a photographed image. An image sensor 107 is composed of a CMOS image sensor and the surrounding circuitry. A two-dimensional, single-plate color sensor in which an on-chip Bayer arrangement primary color mosaic filter is disposed on light-receiving pixels arranged m pixels in the horizontal-direction by n pixels in the vertical-direction is used as the image sensor 107.

A zoom actuator 111 carries out a magnification-change operation by rotation of a cam barrel, not shown, to move the first lens group 101 through the second lens group 103 forward and backward along the optical axis. An aperture-shutter actuator 112 controls the diameter of the opening of the aperture-shutter 102 and adjusts the amount of light for photography, and also controls the exposure time during still image photography. A focus actuator 114 moves the third lens group 105 forward and backward along the optical axis to adjust the focus.

An electronic flash 115 for illuminating an object is used during photography. A flash illumination device that uses a Xenon tube is preferable, but an illumination device comprised of a continuous-flash LED may also be used. An AF auxiliary flash unit 116 projects an image of a mask having a predetermined opening pattern onto an object field through a projective lens to improve focus detection capability with respect to dark objects and low-contrast objects.

A CPU 121 controls the camera main unit in various ways within the image capturing apparatus. The CPU 121 may, for example, have a calculation unit, ROM, RAM, A/D converter, D/A converter, communication interface circuitry, and so forth. In addition, the CPU 121, based on predetermined programs stored in the ROM, executes a set of operations such as driving the various circuits that the image capturing apparatus has, AF, photography, image processing and recording, and so forth.

An electronic flash control circuit 122 controls firing of the electronic flash 115 in synchrony with a photography operation. An auxiliary flash drive circuit 123 controls firing of the AF auxiliary flash unit 116 in synchrony with a focus detection operation. An image sensor drive circuit 124 controls the image sensing operation of the image sensor 107 as well as A/D-converts acquired image signals and transmits the converted image signals to the CPU 121. An image processing circuit 125 performs such processing as γ conversion, color interpolation, interpolation processing which will be described below, JPEG compression and the like on the images acquired by the image sensor 107.

A focus drive circuit 126 controls driving of the focus actuator 114 based on focus detection results so as to move the third lens group 105 forward and backward along the optical axis and adjust the focus. An aperture-shutter drive circuit 128 controls driving of the aperture-shutter actuator 112 to control the opening of the aperture-shutter 102. A zoom drive circuit 129 drives the zoom actuator 111 in response to a zoom operation by the photographer.

A display device 131, such as an LCD, displays information relating to the photographic mode of the image capturing apparatus, preview images before photographing, confirmation images after photographing, focus state display images during focus detection, and the like. An operating switch group 132 is composed of a power switch, a release (photography trigger) switch, a zoom operation switch, a photographic mode selection switch, and the like. A detachable flash memory 133 records photographed images.

Figure 2:
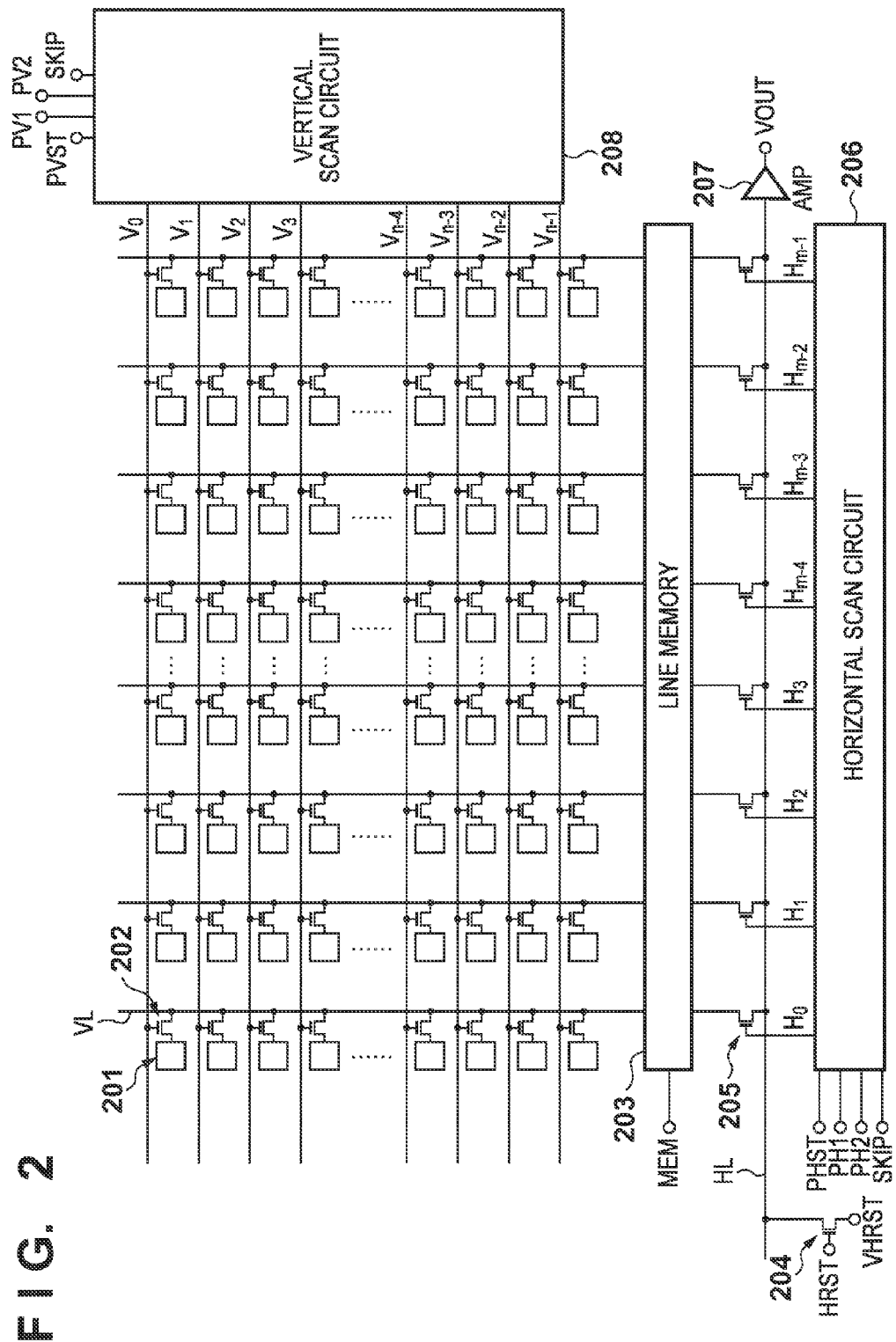
FIG. 2 is a block diagram showing a configuration of an image sensor according to the embodiment of the present invention.

FIG. 2 is a block diagram of the image sensor 107 according to the embodiment of the present invention. It is to be noted that the block diagram of FIG. 2 shows the minimum structure required to explain a readout operation described later, and thus the pixel reset signal and the like are omitted. In FIG. 2, each of photoelectric converter units 201 is comprised of a photodiode, a pixel amp, a reset switch, and the like, and m column×n row of photoelectric converter units are arranged in two dimensions.

A switch 202 is for selecting the outputs of the photoelectric converter units 201, which are selected one line at a time by a vertical scanning circuit 208 which will be described later. A line memory 203 is provided for temporarily storing outputs of photoelectric converter units 201, and stores outputs of one line of photoelectric converter units 201, selected by a vertical scan circuit 208, via vertical output lines VL when a signal MEM becomes H (high) level. A condenser may be used as the line memory 203. A switch 204 is connected to a horizontal output line HL for resetting the horizontal output line HL to a predetermined electric potential VHRST, and is controlled by a signal HRST. Switches 205 are for sequentially outputting the outputs of the photoelectric converter units 201 stored in the line memory 203 to the horizontal output line HL.

A horizontal scan circuit 206 sequentially scans the switches 205 using signals $H_0$ to $H_{m-1}$, thereby sequentially outputting the outputs of the photoelectric converter units 201 stored in the line memory 203 to the horizontal output line HL. A signal PHST is data input of the horizontal scan circuit 206, and signals PH1 and PH2 are shift clock inputs of the horizontal scan circuit 206. The horizontal scan circuit 206 is configured so that, when the signal PH1 is at H level, data is set, and when the signal PH2 is at H level, data is latched. By inputting shift clocks to the signals PH1 and PH2, the signal PHST is sequentially shifted, which makes switches $H_0$ to $H_{m-1}$ H level sequentially, thus makes the switches 205 turn on sequentially. A signal SKIP makes the horizontal scan circuit 206 perform setting during thinning readout of reading out signals from part of pixels as described later. By setting the signal SKIP to H level, operation of the horizontal scan circuit 206 can be skipped at a predetermined interval. The readout operation is described later in detail.

An amplifier 207 amplifies a pixel signal output via the horizontal output line HL from the line memory 203 by a predetermined ratio, and outputs the result as VOUT.

The vertical scan circuit 208 sequentially changes signals $V_0$ to $V_{n-1}$ to H level, thereby selecting the selection switches 202 by row. The vertical scan circuit 208, like the horizontal scan circuit 206, is controlled by data input PVST, shift clocks PV1, PV2, and the thinning readout setting signal SKIP. The operation of the vertical scan circuit 208 is the same as that of the horizontal scan circuit 206, and thus a detailed description thereof is omitted.

Figure 3A:
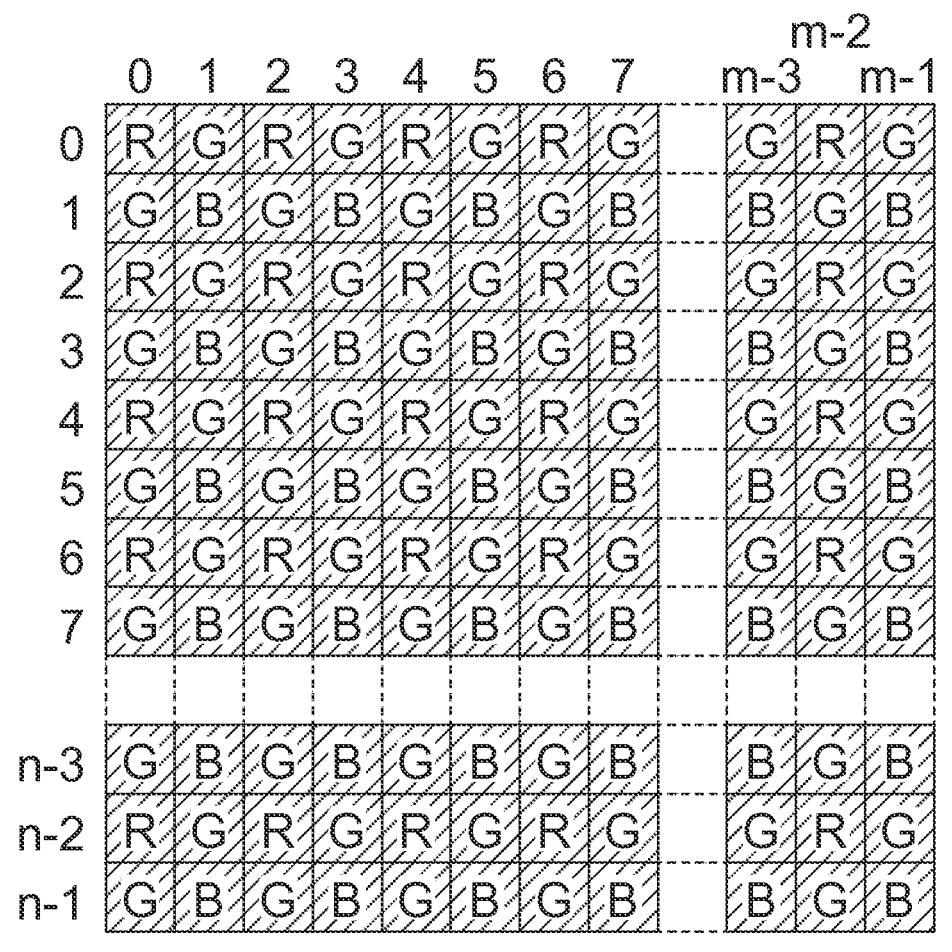

FIGS. 3A and 3B are diagrams illustrating a case in which all pixels of the image capturing apparatus 107 shown in FIG. 2 are read out. The R, G, and B signs depicted in FIG. 3A respectively represent red, green, and blue color filters which cover the pixels. In the present embodiment, a description is given using as an example a Bayer arrangement, in which, of 4 pixels disposed in 2 rows×2 columns, at the 2 pixels positioned diagonally opposite each other are disposed pixels having spectral sensitivity to G (green), and at the other 2 pixels are disposed 1 pixel each having a spectral sensitivity to R (red) and to B (blue). The numbers along the top and left sides in FIG. 3A are X direction and Y direction numbers. The pixels through which slanted lines are drawn are pixels targeted for readout. Since FIG. 3A shows a case of full-pixel readout, slanted lines are drawn in all of the pixels. In addition, in the image sensor 107, usually, shielded OB (optical black) pixels and the like to detect black level are provided, and the OB pixels are also read out. However, in the present embodiment, they will complicate the explication, and are therefore not depicted.

FIG. 3B is a diagram showing a timing chart in a case of reading out signal charges (data) of all the pixels of the image sensor 107. The CPU 121 controls the image sensor drive circuit 124 so as to send a pulse to the image sensor 107, thereby the image sensor 107 is read out. A description is now given of a full-pixel readout operation with reference to FIG. 3B.

First, the vertical scan circuit 208 is driven, making $V_0$ active. At this time, the outputs of the pixels of line 0 are output to the vertical output lines, respectively. In this state, a signal MEM is made active and the data of each pixel is sample-held to the line memory 203. Next, the signal PHST is made active, the shift clocks PH1 and the PH2 are input, the signals from $H_0$ to $H_{m-1}$ are made active in sequence, and the pixel outputs are output to the horizontal output line HL. The pixel outputs are output as VOUT via an amplifier 207, converted into digital data by an AD converter, not shown, and subjected to predetermined image processing at the image processing circuit 125.

Next, the vertical scan circuit 208 makes $V_1$ active, and the pixel outputs of the first line are output to the vertical output lines and similarly temporarily stored in the line memory 203 by the signal MEM. Subsequently, in the same way, the signal PHST is made active, the shift clocks PH1 and the PH2 are input, the signals from $H_0$ to $H_{m-1}$ are made active in sequence, and the pixel outputs are output to the horizontal output line HL. In this manner, by sequentially making the signal active up to $V_{n-1}$, readout up to line n−1 is carried out in sequence.

Figure 4A:
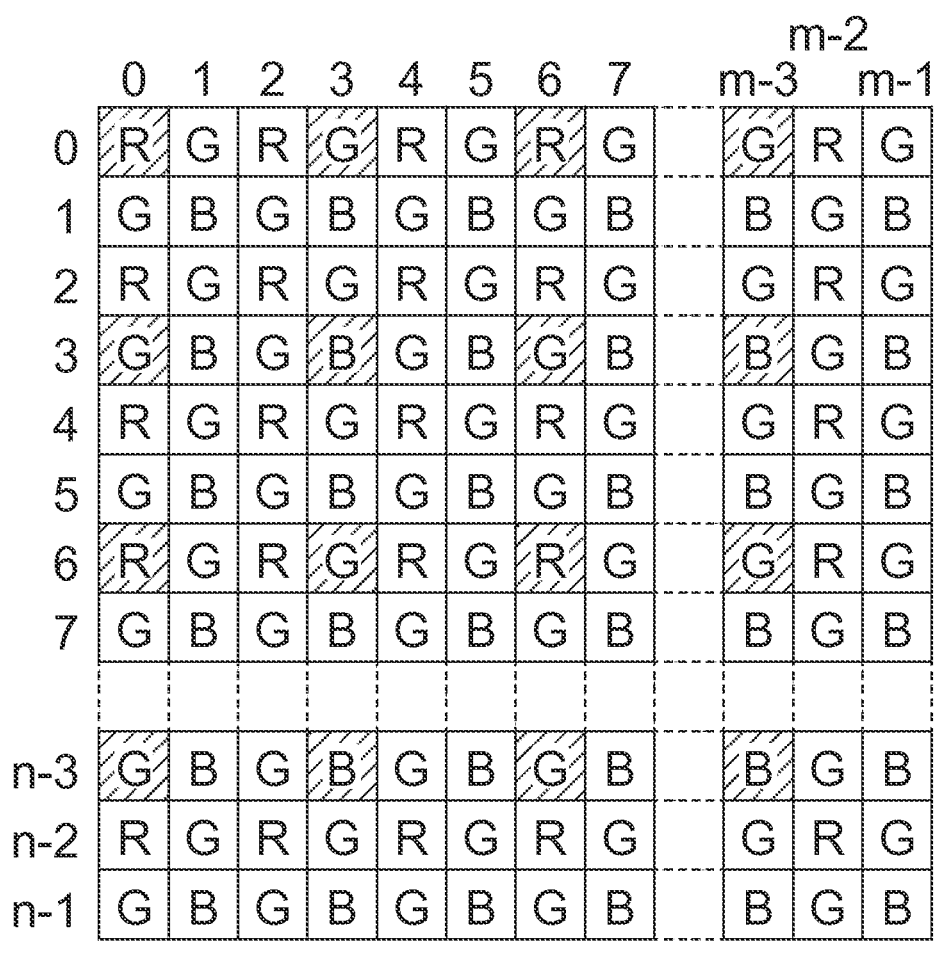

FIGS. 4A and 4B are diagrams for explaining an example of thinning readout of reading out part of pixels of the image sensor 107 having the configuration shown in FIG. 2. In FIG. 4A, the pixels through which slanted lines are drawn are pixels targeted for readout during thinning readout similarly to FIG. 3A. In the present embodiment, readout is thinned to ⅓ in both the X direction and in the Y direction.

FIG. 4B is a diagram showing a timing chart during thinning readout. Using the timing chart shown in FIG. 4B, a description is now given of a thinning readout operation. Thinning readout setting is carried out by making the SKIP terminal, which is a control terminal, of the horizontal scan circuit 206 active. By making the SKIP terminal active, the operations of the horizontal scan circuit 206 and the vertical scan circuit 208 are changed from sequential scanning of every single pixel to sequential scanning of every third pixel. The specific method by which this is accomplished is a known art, and therefore a detailed description thereof is omitted.

In the thinning operation, first, the vertical scan circuit 208 is driven, making $V_0$ active. At this time, the outputs of the pixels of the 0th line are each output to the vertical output line VL. In this state, the signal MEM is made active and the data of each pixel is sample-held to the line memory 203. Next, the signal PHST is made active and the shift clocks PH1 and PH2 are input. At this time, with the setting of the SKIP terminal to active the shift register route is changed, such that pixel outputs are output to the horizontal output line HL at every third pixel, sequentially, as in $H_0$, $H_3$, $H_6$ ... $H_{m-3}$. The pixel outputs are output as VOUT via the amplifire 207, converted into digital data by an AD converter, not shown, and subjected to predetermined image processing at the image processing circuit 125.

Next, the vertical scan circuit 208, like the horizontal scan circuit 206, skips $V_1$ and $V_2$, makes $V_3$ active, and outputs the pixel output of the third line to the vertical output line VL. Subsequently, the pixel output is temporarily stored in the line memory 203 by the signal MEM. Next, similarly to the 0th line, the signal PHST is made active, the shift clocks PH1 and PH2 are input, $H_0$, $H_3$, $H_6$ ... $H_{m-3}$ are made active in sequence, and the pixel outputs are output to the horizontal output line. In this manner, readout up to the n−3th line is carried out in sequence. Thus, as described above, ⅓ thinning readout is carried out both horizontally and vertically.

FIGS. 5A, 5B and FIGS. 6A, 6B are diagrams illustrating the structures of image pickup pixels and focus detection pixels. In the present embodiment, focus detection pixels of a structure described later are dispersed throughout the above-described Bayer arrangement with a predetermined regularity.

Figures 5A, 5B:
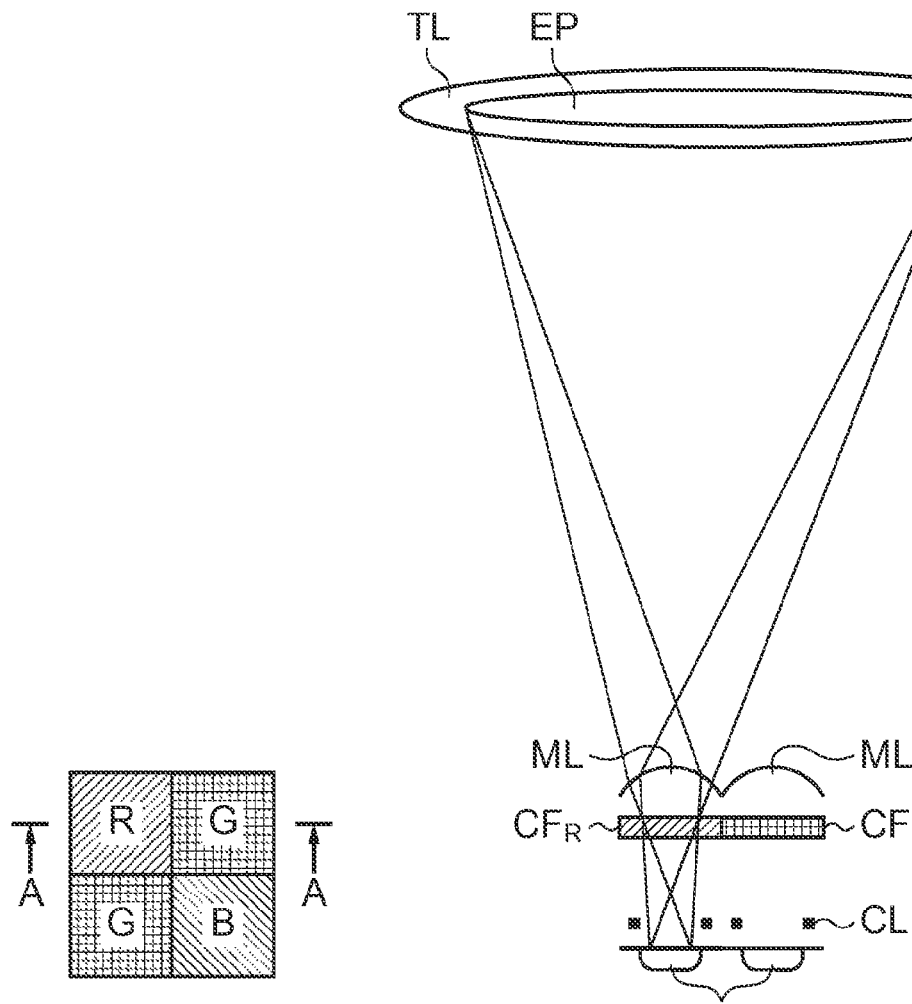
FIGS. 5A and 5B are plan and sectional views of an image pickup pixel of an image sensor according to the embodiment of the present invention.

FIGS. 5A and 5B show the disposition and structure of the image pickup pixels. FIG. 5A is a plan view of 2 rows×2 columns of image pickup pixels. As is known, in a Bayer arrangement G pixels are disposed diagonally across from each other, with R and B pixels disposed at the other two pixels. The 2 row×2 column structure is repeated for disposition.

A cross-sectional view along A-A in FIG. 5A is shown in FIG. 5B. ML indicates the on-chip microlens disposed on the front surface of each pixel, $CF_R$ indicates a R (red) color filter, and $CF_G$ indicates a G (green) color filter. PD (Photodiode) is the photoelectric converter unit 201 of the CMOS image sensor described in FIG. 2, shown schematically. CL (Contact Layer) indicates a wiring layer for forming signal wires that transmit various signals within the CMOS image sensor. TL indicates the photographing optical system, shown schematically.

Here, the on-chip microlens ML and the photoelectric converter element PD of the image pickup pixel are constructed so as to effectively take in as much of the light flux passing through the photographing optical system TL (Taking Lens) as possible. In other words, the microlens ML puts an exit pupil EP of the photographing optical system TL and the photoelectric converter element PD into a conjugate relation, and further, the effective surface area of the photoelectric converter element PD is designed to be a large surface area. In addition, although in FIG. 5B a description is given of a light flux entering an R pixel, the G pixels and the B (blue) pixels have the same structure. Therefore, the exit pupils EP for the image pickup pixels of RGB are large-diameter, such that the light flux (photons) from the object are effectively taken in and the image signal S/N ratio is improved.

Figures 6A, 6B:
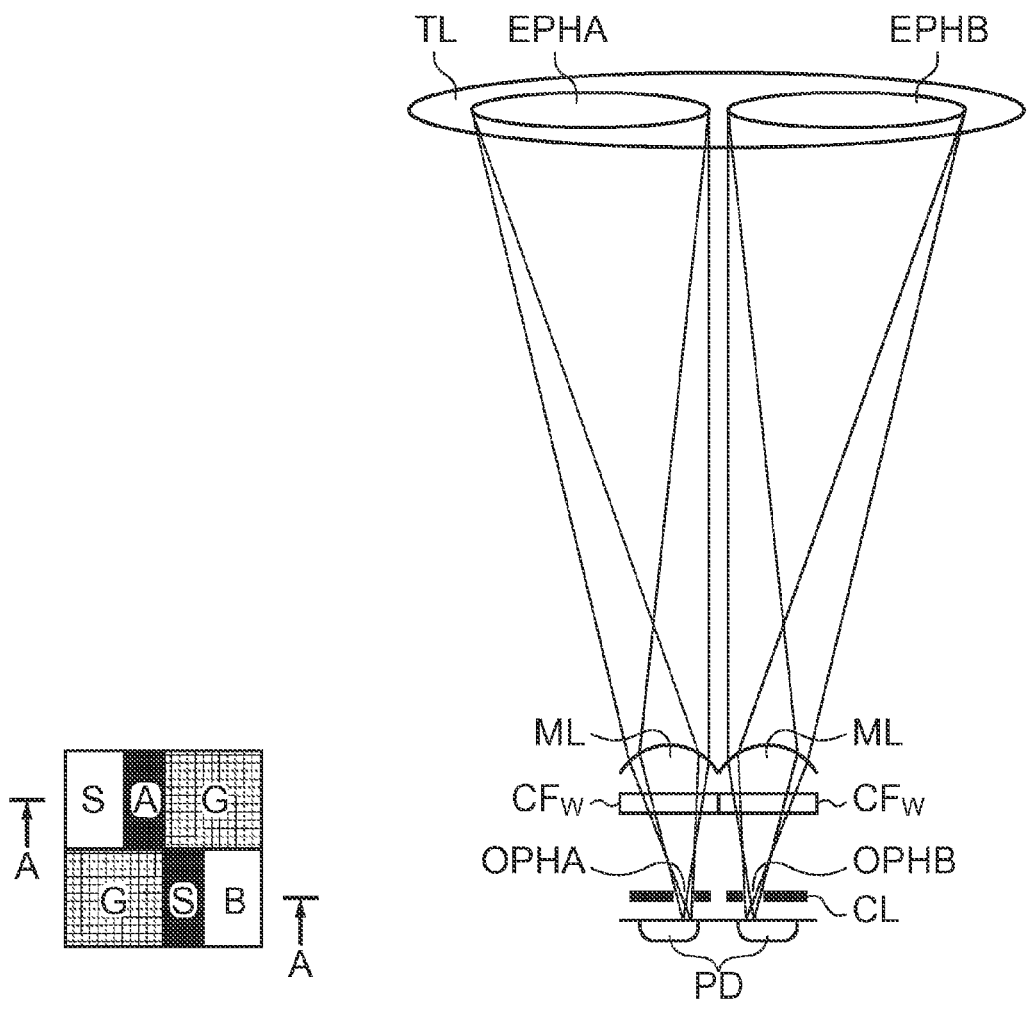
FIGS. 6A and 6B are plan and sectional views of a focus detection pixel of an image sensor according to the embodiment of the present invention.

FIGS. 6A and 6B show the disposition and structure of the focus detection pixels for pupil division in a horizontal direction of the photographing optical system. By dividing the exit pupil in the horizontal direction, focus detection of an object having a luminance distribution in the horizontal direction, such as vertical stripes, can be performed.

FIG. 6A is a plan view of 2 rows×2 columns of pixels including focus detection pixels. In a case in which an image signal is obtained for recording or viewing, at the G pixels the luminance information main component is acquired. This is because of human image recognition characteristics in which human eyes are sensitive to luminance information, and when G pixels are lost image quality degradation is easily noticeable. By contrast, the R pixels and the B pixels are pixels for acquiring color information (color difference information), and because of human visual characteristics in which human eyes are insensitive to color information, image quality degradation is not easily recognized even with a certain amount of loss of the pixels for acquiring color information. Accordingly, in the present embodiment, of the 2 rows×2 columns of pixels, the G pixels are left as image pickup pixels whereas the R pixel and the B pixel are replaced by focus detection pixels. A first focus detection pixel group composed of these focus detection pixels is shown in FIG. 6A as SA and SB.

A cross-sectional view along A-A shown in FIG. 6A is shown in FIG. 6B. The microlens ML and the photoelectric converter element PD have the same structure as the image pickup pixels shown in FIG. 5B. In the present embodiment, since the focus detection pixel signals are not used in image generation, a transparent film $CF_W$ (white) is provided in place of the color filter for color separation. In addition, in order to realize pupil division at the photoelectric converter unit 201, an opening in the wiring layer CL is shifted with respect to the centerline of the microlens ML. Specifically, an opening OPHA in the pixel SA is shifted horizontally (toward the right in FIGS. 6A and 6B), and thus receives a light flux passing through the exit pupil EPHA on the left side of the photographing optical system TL. Similarly, an opening OPHB in the pixel SB is shifted in the opposite direction from pixel SA to the left, and receives the light flux passing through an exit pupil EPHB on the right side of the photographing optical system TL. Accordingly, assume that an object image acquired by groups of pixels SA, having the above structure, regularly arranged so as to be spaced at equal intervals in the horizontal direction is an image A. Then, if it is assumed that an object image acquired by groups of pixels SB, having the above structure, also regularly arranged so as to be spaced at equal intervals in the same horizontal direction is an image B, by detecting the relative positions (phase) of image A and image B, an amount by which the object image is out of focus (a defocus amount) can be detected.

Moreover, in a case in which it is desired to detect the defocus amount of an object having luminance distribution in the vertical direction, such as horizontal stripes, the arrangement may be rotated 90 degrees so that the opening OPHA in the pixel SA is in the lower part of the pixel and the opening OPHB in the pixel SB is in the upper part of the pixel. Alternatively, the opening OPHA may be in the upper pert of the pixel and the opening OPHB may be in the lower part of the pixel.

Figures 7, 8:
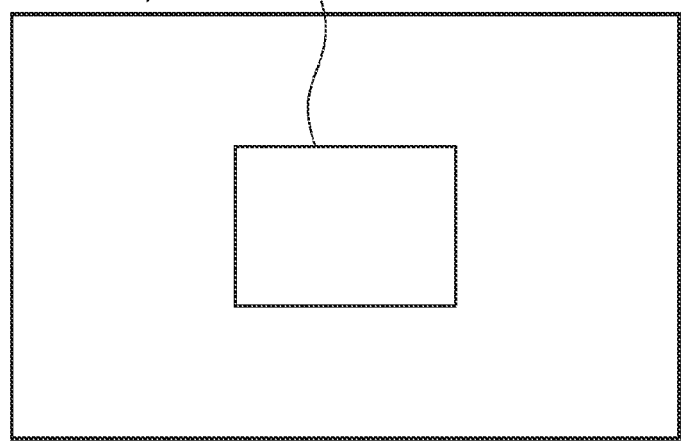
FIG. 7 is a diagram showing a pixel arrangement of the image pickup pixels and the focus detection pixels according to the embodiment of the present invention.
FIG. 8 is a diagram showing an arrangement of the focus detection area according to the embodiment of the present invention.

FIG. 7 is a diagram showing an example of pixel arrangement of the image pickup pixels and the focus detection pixels as explained with reference to FIGS. 5A, 5B and FIGS. 6A, 6B. In the present embodiment, it is possible to read out ⅓ in the horizontal direction and ⅓ in the vertical direction of the whole pixels of the image sensor 107 by thinning readout. In FIG. 7, the pixels through which slanted lines are drawn are pixels targeted for readout, and the focus detection pixels are arranged in the rows and columns to be read out during thinning readout.

In consideration that pixel outputs of the focus detection pixels cannot be used for forming an image, the image sensor 107 of the present invention is configured so that the focus detection pixels are arranged discretely at a certain interval both in the horizontal and vertical directions. Further, the focus detection pixels are not arranged at the pixel positions for G pixels so that the image quality degradation is inconspicuous as described above. According to the present invention, two sets of pixels SA and pixels SB are arranged within a 12×24 pixel block, which represents a single pattern of pixel arrangement.

FIG. 8 is a diagram showing an arrangement of the focus detection area in an entire image pickup area according to the present embodiment. In FIG. 8, an effective pixel area 801 shows an area where image pickup pixels for obtaining an image signal used for generating an image to be recorded are arranged. An area 802 arranged in the central portion in FIG. 8 shows a focus detection area, in which a pixel block which includes focus detection pixels shown in FIG. 7 at a predetermined mixture rate is continuously arranged. On the other hand, no focus detection pixel is arranged in the effective pixel area 801 in other areas than the focus detection area 802.

It should be note that, in FIG. 8, the area including the focus detection pixels is arranged in the central portion of the frame aiming at limiting to an area where an optical condition is good and substantially high accurate focus detection is possible.

Figure 9A:
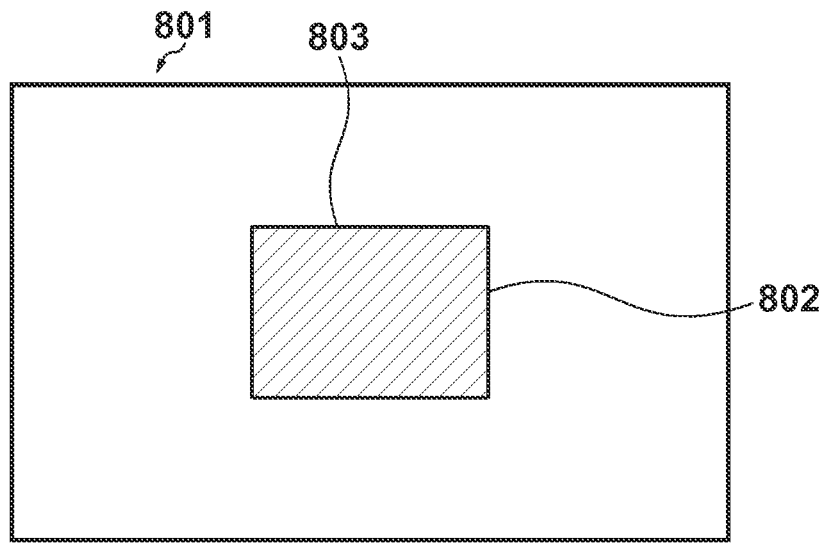
FIGS. 9A and 9B are explanatory views showing an interpolation target area according to the embodiment of the present invention.
Figure 9B:
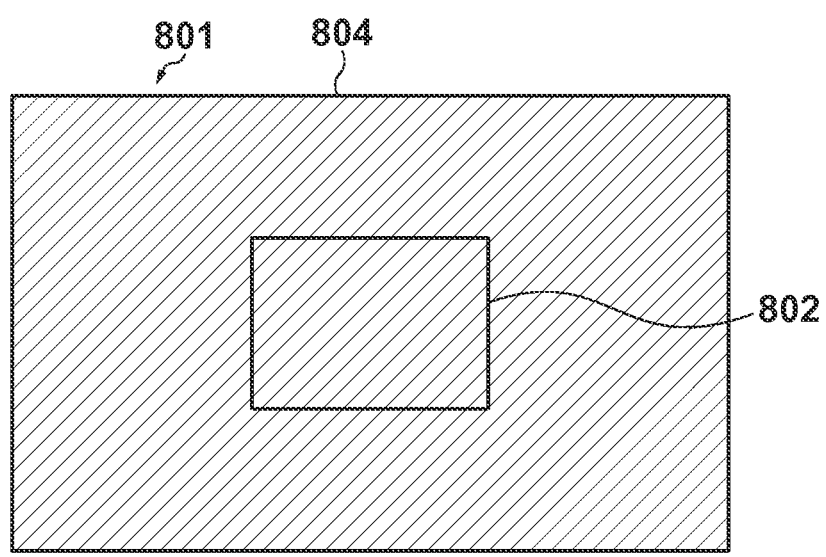

FIGS. 9A and 9B are explanatory views showing an interpolation target area in the pixel interpolation processing performed when generating images during still image capturing and an moving image capturing.

As described above, each focus detection pixel is covered by a transparent film $CF_w$ (white) in place of a color filter for color separation, and its opening is shifted with respect to the centerline of the microlense in one direction in order to realize pupil division. Accordingly, the focus detection pixel is a defective pixel when capturing an image, and it is necessary to interpolate to generate a signal for an image pixel corresponding to the focus detection pixel from image signals read out from the image pickup pixels around the focus detection pixel.

A variety of interpolation methods which may be used here are known. Since the present invention is not limited by the interpolation methods, the explanation thereof is omitted. However, picture quality degradation caused by mis-interpolation may be more conspicuous when sensing a specific object than other objects. Especially, as the ratio of interpolated pixels to non-interpolated pixels increases, the effect of the image quality degradation also increases. According to the present invention, an interpolation target area is changed in response to the rate of the pixels to be interpolated, thereby making the image quality degradation less conspicuous.

FIG. 9A shows an interpolation target area 803 during still image photography. As all of the pixels are read out during still image photography, a ratio of the focus detection pixels (interpolation target pixels) to be interpolated to the image pickup pixels (non-interpolation target pixels) is low, and the effect of the interpolation is also low. Accordingly, the interpolation target area is set to the focus detection area 802, and the interpolation processing is performed in consideration of the arrangement pattern of the focus detection pixels.

FIG. 9B shows an interpolation target area 804 during using electronic view finder and moving image photography. As thinning readout as explained with reference to FIGS. 4A and 4B is performed during using electronic view finder and moving image photography, a ratio of the focus detection pixels to the image pickup pixels is large, and the effect of the interpolation is also large. Accordingly, the interpolation target area is set to the effective pixel area 801, and the interpolation processing is performed according to the arrangement pattern of the focus detection pixels (namely, using the interpolation pattern of the focus detection area 802).

By changing the interpolation target area in accordance with a ratio of the interpolation target pixels to the non-interpolation target pixels as described above, it is possible to make image quality degradation less conspicuous at the border between the interpolation target area and non-interpolation target area where the image quality degradation is generally conspicuous.

In the present invention as described above, the focus detection area 802 is arranged in the central rectangular area of the frame, the present invention is not limited to this. For example, the focus detection area may be arranged discretely at a plurality of areas, or may have the shape of circle, cross, and so on. In these cases, it is also possible to change the interpolation target area in accordance with the mixture rate of the focus detection pixels.

Further, according to the present invention, focus detection pixels SA are respectively paired with focus detection pixels SB to obtain pixel signals for calculating a phase difference, however, the structure of the focus detection pixels is not limited to this. For example, the image sensor may be configured such that each focus detection pixel has a plurality of photoelectric conversion regions, and signals are read out from the plurality of photoelectric conversion regions independently. With this structure, it is possible to obtain a plurality of images having phase difference from each other based on the light beams of an object passed through different pupil regions of the photographing optical system.

<Modification>

In the embodiment as described above, there is one type of arrangement pattern of focus detection pixels in a block, however, the present invention can adopt a case where a plurality of types of arrangement patterns of focus detection pixels are prepared. A case where a plurality of types of arrangement patterns are prepared will be described below.

FIGS. 10A to 10C are exemplified diagrams of two types of arrangement patterns of the image pickup pixels and the focus detection pixels SA and SB explained with reference to FIGS. 5A, 5B and FIGS. 6A and 6B. FIG. 10A shows a first arrangement pattern including the focus detection pixels, the pattern including two pairs of the pixels SA and SB in a 12×24 pixel block. Further, FIG. 10B shows a second arrangement pattern including the focus detection pixels, the pattern including one pair of the pixels SA and SB in a 12×24 pixel block. FIG. 10C is an interpolation pattern, and black pixels indicate interpolation target pixels.

In a case where blocks of the first arrangement pattern and blocks of the second arrangement pattern exist in one frame of the image sensor 107, interpolation processing is performed using the interpolation pattern shown in FIG. 10C. In this way, interpolation target area is interpolated using the interpolation pattern shown in FIG. 10C, thereby the image quality of the blocks of the first arrangement pattern and the image quality of the blocks of the second arrangement pattern, having different arrangement patterns of the focus detection pixels, are matched after the interpolation processing, which can make the image quality degradation inconspicuous.

Figure 11:
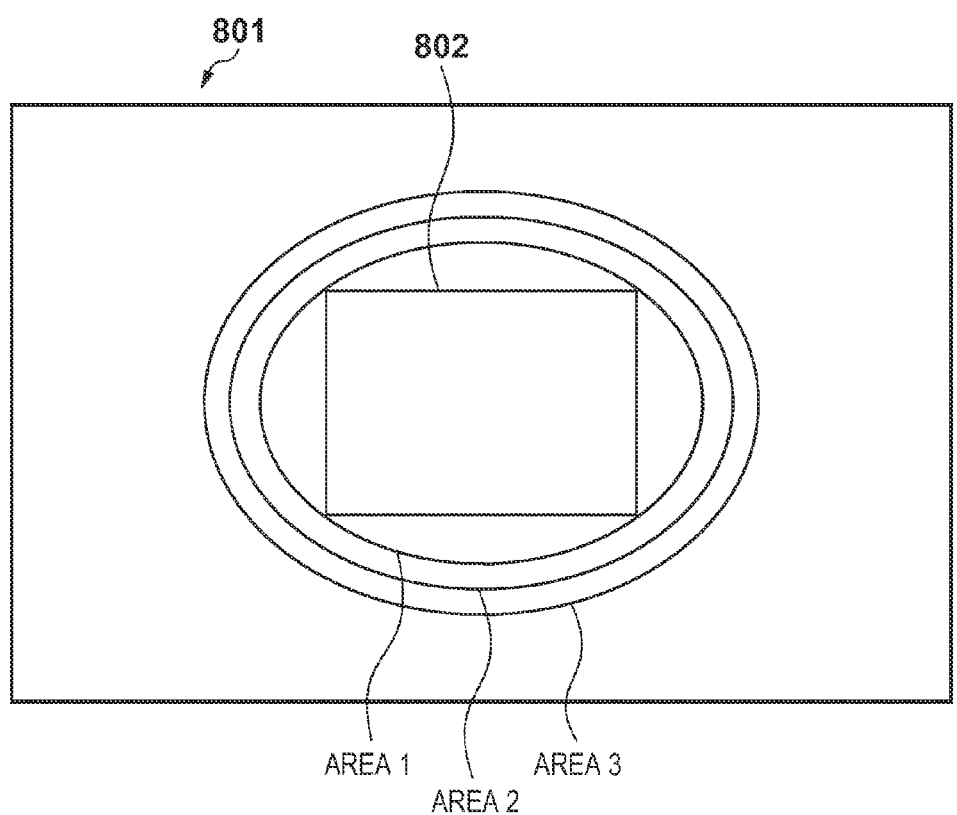
FIG. 11 is an explanatory view of a plurality of areas containing focus detection pixels at different rates according to the modification of the present invention.

In addition, in the embodiment as described above, the interpolation target area during thinning readout is set to the effective pixel region, however, the present invention is not limited to this. For example, three types of arrangement patterns of focus detection pixels may be prepared, and a mixture rate of the focus detection pixels may be gradually reduced toward the periphery of the frame as shown in FIG. 11. In this way, it is possible to make image quality degradation less conspicuous at a boundary between the focus detection area 802 and an area including no focus detection pixel. Note that four or more types of arrangement pattern may be used.

Further, according to the embodiment as described above, the full-pixel readout and thinning readout of ⅓ thinning both in the horizontal and vertical directions are shown, and during the thinning readout in which the ratio of the interpolation target pixels to the non-interpolation target pixels is larger than the full-pixel readout, the interpolation target area is expanded. In this way, it is possible to make the image quality degradation at a boundary between the interpolation target area and the non-interpolation target area less conspicuous, however, the types of the readout modes are not limited to these. Namely, the present invention includes a case where the interpolation target area is expanded in accordance with the rate of the interpolation target pixels.

For example, in a case where addition readout in which pixels are added at least in the horizontal or vertical direction and read out from the image sensor is performed and the same number of pixel outputs as in the thinning readout is obtained, and where the interpolation target area during the addition readout is expanded, the same effect can be obtained. More specifically, in the addition readout, the number of effective pixels corresponding to the pixel outputs is larger then the thinning readout, an effect of image quality degradation caused by the interpolation processing is small. Therefore, the interpolation readout to make the image quality degradation at the boundary of the interpolation target area and the non-interpolation target area less conspicuous.

Further, for example, the thinning readout with a predetermined thinning rate at least in the horizontal or vertical direction (⅓ thinning in the vertical direction, for example) and the thinning readout with a higher thinning rate at least in the horizontal or vertical direction (⅕ thinning in the vertical direction, for example) may be performed. When comparing the obtained images, the effect of the interpolation processing is high in the image read out by the thinning readout with the higher thinning rate (e.g., ⅕ thinning in the vertical direction). Accordingly, during the thinning readout with the higher thinning rate (⅕ thinning, in this case), the interpolation target area may be expanded to make image quality degradation at a boundary between the interpolation target area and the non-interpolation target area less conspicuous.

It should be noted that in the embodiment as described above, a digital camera in which a camera body and a photographing optical system are integrally formed is explained as an example, however, the present invention may be applicable to a camera with exchangeable lens unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-218321, filed on Sep. 30, 2011 which is hereby incorporated by reference herein in its entirety.

The invention claimed is:
1. An image capturing apparatus comprising:
an image sensor having first pixels used except for generating image signals and second pixels used for generating the image signals, the first pixels arranged based on a predetermined regularity in a first area; and
a signal processing unit configured to perform interpolation processing on signals output from the first pixels in the first area,
wherein the signal processing unit performs the interpolation processing on the image signals output from the second pixels in an area other than the first area, with an arrangement pattern of the second pixels which are targets of the interpolation processing corresponding to an arrangement pattern of the first pixels in the first area based on the predetermined regularity.

2. The image capturing apparatus according to claim 1, wherein the signal processing unit has a first mode of performing the interpolation processing on the image signals output from the second pixels in the area other than the first area, and a second mode of not performing the interpolation processing on the image signals output from the second pixels in the area other than the first area.

3. The image capturing apparatus according to claim 2, further comprising:
a readout unit configured to read out signals from the image sensor,
wherein the signal processing unit operates in the first mode if a rate of the signals output from the first pixels among the signals read out by the readout unit is a first rate, and operates in the second mode if a rate of the signals output from the first pixels among the signals read out by the readout unit is a second rate which is lower than the first rate.

4. The image capturing apparatus according to claim 1, wherein the first pixels are used for focus detection and independently output the signals obtained by receiving light beams which passed different regions of an exit pupil of a photographing optical system.

5. The image capturing apparatus according to claim 4, further comprising:
a detection unit configured to detect a phase difference between a pair of signals output from the first pixels; and
a control unit configured to control a position of the photographing optical system on the basis of the phase difference.

6. The image capturing apparatus according to claim 2, further comprising:
a readout unit configured to read out signals from the image sensor,
wherein the signal processing unit operates in the first mode if the readout unit reads out signals from the image sensor by thinning pixels, and operates in the second mode if the readout unit reads out signals from the image sensor without thinning pixels.

7. The image capturing apparatus according to claim 2, further comprising:
a readout unit configured to read out signals from the image sensor,
wherein the signal processing unit operates in the first mode if the readout unit reads out signals from the image sensor by thinning pixels in a third rate, and operates in the second mode if the readout unit reads out signals from the image sensor by thinning pixels in a fourth rate which is lower than the third rate.

8. The image capturing apparatus according to claim 3, wherein the signal processing unit operates in the first mode if the readout unit reads out signals from the image sensor by thinning pixels, and operates in the second mode if the readout unit reads out signals from the image sensor without thinning pixels.

9. The image capturing apparatus according to claim 3, wherein the signal processing unit operates in the first mode if the readout unit reads out signals from the image sensor by thinning pixels in a third rate, and operates in the second mode if the readout unit reads out signals from the image sensor by thinning pixels in a fourth rate which is lower than the third rate.

10. The image capturing apparatus according to claim 3, wherein the image sensor includes a second area arranged outside of the first area, a proportion of the first pixels to total pixels in the second area being lower than that in the first area.

11. The image capturing apparatus according to claim 1, wherein each pixel of the image sensor is covered by color filters, and the first pixels replace pixels for obtaining color information in accordance with an arrangement of the color filters.

12. A control method of an image capturing apparatus which includes an image sensor having first pixels used except for generating image signals and second pixels used for generating the image signals, the first pixels arranged based on a predetermined regularity in a first area, the method comprising:
 a signal processing step of performing interpolation processing on signals output from the first pixels in the first area,
 wherein, in the signal processing step, the interpolation processing is performed on the image signals output from the second pixels in an area other than the first area, with an arrangement pattern of the second pixels which are targets of the interpolation processing corresponding to an arrangement pattern of the first pixels in the first area based on the predetermined regularity.

13. An image capturing apparatus comprising:
 an image sensor having first pixels used except for generating image signals and second pixels used for generating the image signals, the first pixels arranged based on a predetermined regularity in a first area; and
 an image processing circuit that performs interpolation processing on signals output from the first pixels in the first area,
 wherein the image processing circuit performs the interpolation processing on the image signals output from the second pixels in an area other than the first area, with an arrangement pattern of the second pixels which are targets of the interpolation processing corresponding to an arrangement pattern of the first pixels in the first area based on the predetermined regularity.

14. The image capturing apparatus according to claim 13, wherein the image processing circuit has a first mode of performing the interpolation processing on the image signals output from the second pixels in the area other than the first area, and a second mode of not performing the interpolation processing on the image signals output from the second pixels in the area other than the first area.

15. The image capturing apparatus according to claim 14, further comprising:
 an image sensor drive circuit that reads out signals from the image sensor,
 wherein the image processing circuit operates in the first mode if a rate of the signals output from the first pixels among the signals read out by the image sensor drive circuit is a first rate, and operates in the second mode if a rate of the signals output from the first pixels among the signals read out by the image sensor drive circuit is a second rate which is lower than the first rate.

16. The image capturing apparatus according to claim 13, wherein the first pixels are used for focus detection and independently output the signals obtained by receiving light beams which passed different regions of an exit pupil of a photographing optical system.

17. The image capturing apparatus according to claim 16, further comprising:
 a processor that serves as a detection unit that detects a phase difference between a pair of signals output from the first pixels; and
 a focus drive circuit that controls a position of the photographing optical system on the basis of the phase difference.

18. The image capturing apparatus according to claim 15, wherein the image processing circuit operates in the first mode if the image sensor drive circuit reads out signals from the image sensor by thinning pixels, and operates in the second mode if the image sensor drive circuit reads out signals from the image sensor without thinning pixels.

19. The image capturing apparatus according to claim 15, wherein the image processing circuit operates in the first mode if the image sensor drive circuit reads out signals from the image sensor by thinning pixels in a third rate, and operates in the second mode if the image sensor drive circuit reads out signals from the image sensor by thinning pixels in a fourth rate which is lower than the third rate.

20. The image capturing apparatus according to claim 15, wherein the image sensor includes a second area arranged outside of the first area, a proportion of the first pixels to total pixels in the second area being lower than that in the first area.

21. The image capturing apparatus according to claim 13, wherein each pixel of the image sensor is covered by color filters, and the first pixels replace pixels for obtaining color information in accordance with an arrangement of the color filters.

* * * * *